United States Patent
Miyake et al.

[15] 3,694,548
[45] Sept. 26, 1972

[54] ENDURACIDIN DERIVATIVES

[72] Inventors: Akira Miyake, Nishinomiya; Hidesuke Iwasaki, Itami; Kenzo Naito, Suita, all of Japan

[73] Assignee: Takeda Chemical Industries Ltd., Osaka, Japan

[22] Filed: Nov. 22, 1968

[21] Appl. No.: 778,300

[30] Foreign Application Priority Data

Nov. 22, 1967 Japan ..................42/7524

[52] U.S. Cl. ..................................424/118, 424/123
[51] Int. Cl. ..................................A61k 21/00
[58] Field of Search..............................424/115–123

[56] References Cited

OTHER PUBLICATIONS

Takeda, Derwent Farmdoc 37,713, NE 68, 16640, Pages 133– 141, Published 5-27-69

*Primary Examiner*—Albert T. Meyers
*Assistant Examiner*—Daren M. Stephens
*Attorney*—Wenderoth, Lind & Ponack

[57] ABSTRACT

Enduracidin derivatives which have anti-microbial activity are produced by catalytic reduction of Enduracidin or a salt thereof.

4 Claims, No Drawings

ID DERIVATIVES

DESCRIPTION OF INVENTION

The present invention relates to new Enduracidin derivatives which are useful as antibiotics. More particularly, the present invention relates to reduction products of Enduracidin or its acid salt and processes for preparation thereof.

Enduracidin is the general name of an antibiotic which is produced by *Streptomyces fungicidicus* No. B-5477 (ATCC-21013). The production and antibacterial properties are reported by E. Higashide et al (The Journal of Antibiotics An International Journal Vol. XXI, No. 2, pp. 126–137). The isolation and characterization of Enduracidin are reported by M. Asai et al (Ibid. Vol. XXI, No. 2, pp. 138–146) and the antimicrobial activity of Enduracidin is reported by K. Tsuchiya et al (Ibid. Vol. XXI, No. 2, pp. 147–153). Enduracidin itself and the process for the preparation thereof are also patented in French Pat. No. 1,514,139, Belgian Pat. No. 688207, Spanish Pat. No. 332148, East German Pat. No. 58789, the Argentine Pat. No. 159523 and South African Pat. No. 66/6073, etc.

Enduracidin is an antibiotic of the peptide type which is composed of such moieties as aspartic acid, threonine, allothreonine, serine, glycine, alanine, ornithine, citrulline, α-amino-4-hydroxyphenylacetic acid, α-amino-3,5-dichloro-4-hydroxyphenylacetic acid, fatty acid and two basic amino acids and others. This antibiotic shows the maximum absorptions in the infrared spectrum measured in 90 percent methanol at about 230 m$\mu$ and 263 m$\mu$. It is a colorless powder which decomposes at 225° to 240° C. and has very strong antimicrobial activity against Gram-positive bacteria and phytopathogenic bacteria, and shows no cross-resistance with such known antibiotics as tetracycline, chloramphenicol, erythromycin, cephaloridine, oleandmycin, kanamycin, streptomycin, penicillin-G, aminobenzyl-penicillin and neomycin.

It has been discovered that, in comparison with Enduracidin as such, its reduction product has a considerably reduced toxicity, i.e. $LD_{50}$ of Enduracidin reduction product is 350 mg/Kg. (intravenous injection in mice), while $LD_{50}$ of Enduracidin itself is 33.5–60 mg/Kg. in the same condition. Further, Enduracidin reduction product has an improved stability and a therapeutic activity which is equally or more effective than Enduracidin itself.

The principal object of the present invention is to provide reduction products of Enduracidin or acid salt thereof which have lower toxicity to mammals and keep higher concentrations of the antibiotics in the blood against the hitherto-known Enduracidin.

Another object of this invention is to provide Enduracidin derivatives which have strong antimicrobial activity against Gram-positive bacteria and also even against such bacteria that have acquired resistance to hitherto-known antibiotics such as streptomycin and neomycin.

A further object is to provide processes for preparing the novel and useful reduction products.

Still another object of the present invention is to provide new pharmaceutical compositions containing one or more of the reduction products.

Other objects of the present invention and advantageous features thereof will become apparent as the description proceeds.

Enduracidin reduction product is obtained by catalytic reduction of Enduracidin or a salt thereof in the presence of a metal catalyst at atmospheric or elevated pressure involving the use of, e.g. platinum, palladium.

Generally speaking, the reaction is carried out in a solvent which is non-reactive with Enduracidin or its salt and in which Enduracidin or its salt can be dissolved or suspended. Such a solvent is exemplified by water, methanol, acetic acid, and dioxane or a mixture thereof. As the starting material of this invention, of the reduction process, Enduracidin or a salt thereof may be used. As the salt of Enduracidin, there may be employed an organic salt or an inorganic salt. Examples of the inorganic salt include the hydrochloride, nitrate and the like, while said organic salt may be the formate, acetate, propionate, aspartate or glutamate and the like.

Said metal catalyst to be employed in the reaction, may be one which is generally used for catalytic reduction. For example, platinum, palladium, nickel or other catalysts possessing varied degrees of activity which catalysts can be used either as such or in the form supported by carriers. As for the amount of said catalyst, it is sufficient that the catalyst be present in amount from 1 to 10 percent based on the weight of Enduracidin. While the reaction pressure may be atmospheric, the reaction time is reduced when the reaction is conducted at an elevated pressure of the order of 20 Kg./cm$^2$. The reaction time ranges from 8 to 10 hours at atmospheric pressure and 4 to 8 hours at the elevated pressure. The time when the hydrogen ceased to be adsorbed may be regarded as the end point of the reaction.

Enduracidin reduction product thus obtained, may be used for medical purposes after proper purification or may be used for further reaction, as desired, directly or after the separation of the product from the reaction mixture.

In these reduction processes, about two moles of hydrogen gas per mole of Enduracidin or salt are absorbed. This fact supposes that two double bonds of Enduracidin are saturated by the catalytic reduction.

To separate the product from the reaction mixture, the catalyst is, for example, filtered off and the filtrate is concentrated to dryness under reduced pressure. Then, the residue is washed with acetone or other organic solvent, and vacuum-dried in a desiccator. The resulting powder is sufficiently pure, but it may be further allowed to recrystallize from e.g. a mixture of methanol, acetone and water. In case a salt of Enduracidin has been reduced, the desired reduction product in free form may be obtained, for example, by a process where the reduction product is dissolved in a solvent, and the solution is passed columnwise over weakly basic ion exchange resins, or neutralized to pH 8 to 8.5 with a tertiary amine such as trialkylamine and, if necessary, a solvent in which the product is sparingly soluble is added so as to cause precipitation of the product.

The reduction products of Enduracidin or acid salts are useful as antibiotic agents and generally administered in the form of powder, capsule, syrup, oil, injection, ointment, tablet, etc., i.e. orally, parenterally, topically or externally. Pharmaceutical compositions containing one or more of the reduction products can be prepared according to any per se conventional means for the preparation of capsules, syrups, oils, injections, etc.

In the aforesaid various administrational forms, the active ingredient may be present in a minor proportion with the carrier constituting the major proportion. However, the reverse relationship may also be possible, so that a minor proportion of carrier is employed in association with a major proportion of active ingredient. Examples of administrational compositions are hereinafter exemplified.

Ointment
| | |
|---|---|
| Enduracidin reduction product | 1 g. |
| Methyl para-hydroxybenzoate | 0.12 g. |
| Propyl para-hydroxybenzoate | 0.03 g. |
| Anhydrous lanoline | 9.85 g. |
| White petrolatum | 89 g. |

The ointment is used for the treatment of superficial cutaneous and mucosal infections.

Solution
| | |
|---|---|
| Enduracidin reduction product | 0.5 g. |
| Distilled water | to make 100 ml. |

The solution is administered for the treatment of the suppurative middle ear atitis.

Oils
| | |
|---|---|
| Enduracidin reduction product | 0.5 g. |
| Cera alba | 4.8 g. |
| Peanut oil | to make 100 ml. |

Injection
| | |
|---|---|
| Enduracidin reduction product | 25 mg. |
| Polyoxyethylene ether of hydrogenated castor oil | 50 mg. |
| 1N-hydrochloride | 0.057 ml. |
| Sterilized distilled Water | to make 1 ml. |

Tablets
| | |
|---|---|
| Enduracidin reduction product | 0.1 g. |
| Lactose | 0.195 g. |
| Cornmeal | 0.1 g. |
| Magnesium stearate | 0.005 g. |
| Total: | 0.4 g/Tablet |

The pharmaceutical compositions show a greater therapeutic activity against infections caused by *Streptococcus pyogenes*, *Staphylococcus aureus*, *Diplococcus pneumoniae*, etc. than that of hitherto known antibiotics.

A typical effective daily dose of the reduction product is usually about 0.02 to 20 mg/Kg./day, desirably 0.1 to 0.5 mg/Kg., for injection, although an increased or reduced daily dose is also effective depending on the severity of the infection being treated.

The following examples show presently preferred embodiments of this invention. It is to be understood that the following examples are solely for the purpose of illustration and not for limitation of this invention, and that variations may be resorted to without departing from the spirit of the invention. In the examples, parts by weight bear the same relation to parts by volume as do grams to milliliters.

EXAMPLE 1

In 100 parts by volume of 80 percent acetic acid is suspended 2 parts by weight of platinum oxide, and the suspension is thoroughly stirred in hydrogen gas streams so that the hydrogen gas is absorbed thereto. On the other hand, 20 parts by weight of Enduracidin hydrochloride is dissolved in 300 parts by volume of 80 percent acetic acid, and the resulting solution is added to the above suspension. The mixture is vigorously stirred in hydrogen gas stream at atmospheric pressure until the hydrogen gas ceases to be absorbed (about 385 parts by volume of hydrogen gas is absorbed). The reaction mixture is subjected to the filtration of the catalyst and the filtrate is condensed under reduced pressure. The residue is washed with acetone several times and, then, vacuum-dried in a desiccator packed with phosphorus pentoxide to obtain colorless powder of the Enduracidin hydrochloride reduction product.

Yield: 1.8 parts by weight.

1. Decomposition point : 234°–240° C
   (Enduracidin hydrochloride : 235°–245° C)
2. Elementary analysis:

| | Reduction Product | Hydrochloride |
|---|---|---|
| C: | 52.05, | 52.07 |
| H: | 6.22, | 6.25 |
| N: | 14.27, | 14.21 |
| Cl: | 4.51, | 4.77 |

3. Specific rotation:
   $[\alpha]_D^{26} + 82.8°$ (C=1.0 in 70% methanol).
   [Enduracidin hydrochloride: $[\alpha]_D^{23} + 80°$ (C=0.5 in methanol)]
4. Solubilities:
   Slightly soluble in water; soluble in aqueous methanol, aqueous acetone, aqueous acetic acid, dimethyl-formamide, pyridine and dioxane; insoluble in acetone, ethyl acetate, ether, chloroform and the like.
5. Rf value (paper partition chromatography):
   Paper partition chromatograph(measured) by using ascending method on "Whatman filter paper No. 1" (W. and R. Balston Ltd., Great Britain) is as follows:

| Solvents | Rf value* |
|---|---|
| Acetic acid n-Butanol. Water (1:4:5) | 0.45 ± 0.1 |
| n-Butanol saturated with water | 0.0 |
| Pyridine. n-Butanol. Water (3:4:7) | 0.80 ± 0.1 |

*These values are the same as those of original Enduracidin hydrochloride.

6. Color Reaction:

| Reagent | Result* |
|---|---|
| Ninhydrin reagent | positive (pale-brownish violet) |
| Barton's reagent (a mixture of equal volume of 1% aqueous ferric chloride and 1% aqueous potassium ferricyanate) | positive (pale-blue) |
| Dragendorff reagent | positive (orangish-yellow) |
| Alkaline potassium permanganate | discoloration occurs (reduction) |

*These results are the same as those of original Enduracidin hydrochloride.

7. Ultraviolet absorption spectrum:
   The significant maximum-absorptions observed are as follows:

|  | Reduction Product | Enduracidin hydrochloride |
|---|---|---|
| $\lambda_{max}^{N/10\ HCl}$ | 230 m$\mu$ ($\epsilon_{1cm}^{1\%}$ =201)<br>276 m$\mu$ ($\epsilon_{1cm}^{1\%}$ =32.4)<br>282 m$\mu$ ($\epsilon_{1cm}^{1\%}$ =30.9)<br>250 m$\mu$ ($\epsilon_{1cm}^{1\%}$ =289) | 230 m$\mu$ ($\epsilon_{1cm}^{1\%}$ =195)<br>273 m$\mu$ ($\epsilon_{1cm}^{1\%}$ =112)<br>253 m$\mu$ ($\epsilon_{1cm}^{1\%}$ =335) |
| $\lambda_{max}^{N/10\ NaOH}$ | 293 m$\mu$ ($\epsilon_{1cm}^{1\%}$ =68) | 287 m$\mu$ ($\epsilon_{1cm}^{1\%}$ =112)<br>(shoulder) |

8. Infrared absorption spectrum:

The infrared absorption spectrum is observed by the potassium bromide disk method. The significant absorption bands in microns are listed in the following table and the results are the same as those of original Enduracidin itself.

3.05 (strong)
3.25 (shoulder)
3.38 (shoulder)
3.45 (strong)
5.75 (shoulder)
5.95 (shoulder)
6.09 (strong)
6.23 (shoulder)
6.47 (shoulder)
6.55 (shoulder)
6.61 (strong)
6.95 (shoulder)
7.25 (middle)
8.16 (broad, strong)
8.51 (middle)
9.89 (middle)
10.40 (weak)
11.93 (middle)
12.30 (weak)

9. Toxicity

The toxicity of the product as determined with mice is LD$_{50}$=350 mg./Kg. (intravenous injection) or about 1g./Kg. (intraperitoneal injection) in mice. On the other hand, LD$_{50}$ of original Enduracidin in mice is 33.5–60 mg./Kg. (intravenous injection).

10. Antibacterial spectra:

The antibacterial spectrum of the product as measured on TSA medium enriched with cattle blood is as follows:

| Test microorganism | Minimum inhibitory concentration(mcg/ml) | |
|---|---|---|
|  | reduction product | Original |
| Staphylococcus aureus 209P | 0.78 | 0.78 |
| Streptococcus pyogenes E-14 | 0.78 | 0.78 |
| Streptococcus pyogenes Dick | 0.78 | 0.39 |
| Streptococcus pyogenes S-8 | 0.39 | 0.78 |
| Streptococcus pyogenes NY-5 | 0.78 | 0.78 |
| Streptococcus viridans SP | 0.78 | 0.78 |
| Diplococcus pneumoniae I | 0.78 | 0.78 |
| II | 0.39 | 0.78 |
| III | 0.39 | 0.78 |
| Corynebacterium diphtheriae | 0.78 | 0.78 |

The result of a therapeutic test in mice infected with Staphylococcus aureus 308A-1 is as follows.

| | Surviving animals, in heads | | | | | | |
|---|---|---|---|---|---|---|---|
| Survival rate | | | animals tested, in heads | | | | |
| dosage(mg./kg.) | 100 | 50 | 25 | 12.5 | 6.2 | 3.1 | ED$_{50}$ (mg./kg.) |
| Amount of inoculum *(LD$_{50}$) | | | | | | | |
| 5.6 | 5/5 | 5/5 | 5/5 | 4/5 | 4/5 | 1/5 | 4.83 |
| dosage(mg./kg.) | 40 | 20 | 10 | 5 | | | ED$_{50}$ (mg./kg.) |
| Amount of inoculum *(LD$_{50}$) | | | | | | | |
| 5.6 | 5/5 | 5/5 | 4/5 | 3/5 | | | 5.0 |

*A multiple of LD$_{50}$.

Thus, the ED$_{50}$ of this product is 5.0 mg./Kg. when the amount of inoculation is 5, 6 times the median lethal dose LD$_{50}$. The ED$_{50}$ of Enduracidin under similar condition is 8.0 mg./Kg.

EXAMPLE 2

17 parts by weight of the reduction product of Enduracidin acetate as colorless powder is obtained in the same manner as in Example 1 except employing Enduracidin acetate instead of Enduracidin hydrochloride.

Decomposition point: 232–240° C.
Infrared absorption
3.06, 3.45, 5.75(shoulder), 5.9(shoulder),
6.1, 6.45(shoulder), 6.7, 6.9, 7.3, 7.9–8.1,
8.5, 9.9, 11.9, 15–19$\mu$.
Ultraviolet absorption
$\lambda$ max 230 m$\mu$ ($\epsilon_{1cm}^{1\%}$ 199, in 90% methanol)
$\lambda$ max 276 m$\mu$ ($\epsilon_{1cm}^{1\%}$ 32.2, in 90% methanol)

EXAMPLE 3

In 50 ml. of 70 percent methanol is dissolved 10 g. of Enduracidin hydrochloride reduction product prepared in Example 1, while heating at 50° C. With vigorous stirring, triethylamine is added dropwise to the solution so as to adjust the latter of pH 8.0 – 8.5.

The solution is allowed to stand overnight in a refrigerator and the resulting precipitates are separated centrifugally and washed twice with water. Then these precipitates are vacuum-dried in a desiccator, 8.8 g. of a colorless powdery reduction product in free form are obtained.

Decomposition point: 238° – 245° C.
Elementary analysis:
C: 52.73
H: 6.29
N: 14.75
Cl: 2.98
$[\alpha]_D^{23}$ + 53.2° (C=0.5, dimethylformamide).

This product is sparingly soluble in water relative to Enduracidin hydrochloride reduction product.
Infrared absorption
3.07, 3.45, 5.75(shoulder), 5.9(shoulder),
6.1, 6.45(shoulder), 6.6, 6.8, 7.2, 7.9–8.1,
8.5, 9.9, 11.9, 15–19 $\mu$.
Ultraviolet absorption
$\lambda$ max 264 m$\mu$ ($\epsilon_{1cm}^{1\%}$ 54.6, in 95% methanol)
$\lambda$ max 310 m$\mu$ ($\epsilon_{1cm}^{1\%}$ 17.7, in 95% methanol)
$\lambda$ max 230 m$\mu$ ($\epsilon_{1cm}^{1\%}$ 201, in N/10 HCl)
$\lambda$ max 276 m$\mu$ ($\epsilon_{1cm}^{1\%}$ 32.4, in N/10 HCl)
$\lambda$ max 282 m$\mu$ ($\epsilon_{1cm}^{1\%}$ 30.9, in N/10 HCl)

λ max 250 mμ ($\epsilon_{1cm}^{1\%}$ 289, in N/10 NaOH)
λ max 293 mμ ($\epsilon_{1cm}^{1\%}$ 68, in N/10 NaOH)

EXAMPLE 4

25 parts by weight of Enduracidin hydrochloride is dissolved in 250 parts by volume of 70% methanol, followed by the dissolution of 6 parts by volume of acetic acid. 50 parts by weight of 5 percent palladium-activated carbon (50 percent moisture) is added to the above solution so that the reduction takes place at an initial pressure of 20 Kg./cm² of hydrogen gas and at room temperature, continuing until no more hydrogen gas is absorbed (3.5 hours). The catalyst is centrifugally discarded and the reaction mixture is subjected to the filtration using Toyo Roshi No. 5 C (Toyo Roshi Kaisha Ltd.) as a filter paper. The filtrate is concentrated to dryness under reduced pressure and washed with acetone. The product is then vacuum-dried in a desiccator, whereupon 19.4 parts by weight of a colorless powdery reduction product in hydrochloride form is obtained.

Decomposition point 230°–233° C.
Elementary analysis:
C: 50.96
H: 6.29
N: 14.11
Cl: 4.38
Infrared absorption
3.06, 3.45, 5.75(shoulder), 5.9(shoulder)
6.1, 6.45(shoulder), 6.6, 6.9, 7.2, 7.9–8.1,
8.5, 9.9, 11.9, 15–19 μ.
Ultraviolet absorption
λ max 230 mμ ($\epsilon_{1cm}^{1\%}$ 200, in 90% methanol)
λ max 275 mμ ($\epsilon_{1cm}^{1\%}$ 31.5, in 90% methanol)

EXAMPLE 5

25 parts by weight of Enduracidin hydrochloride is dissolved in 250 parts by volume of 70 percent methanol, followed by addition of 6 parts by volume of acetic acid. To the solution is added a platinum black, which is previously prepared from 0.5 part by weight of platinum oxide, so that the reduction takes place at an initial pressure of 20 Kg./cm² of hydrogen gas and at room temperature for 4 hours. Then, the catalyst is filtered off and the filtrate is concentrated to dryness under reduced pressure. The residue is washed with acetone and vacuum-dried in a desiccator. The above procedure yields 22.2 parts by weight of a colorless powdery Enduracidin reduction product in hydrochloride form.

Decomposition point: 230°–233° C.
Elementary analysis:
C: 50.49
H: 5.96
N: 13.87
Cl: 4.21

Concentrations of antibiotics (γ/ml. in plasma) in the blood on intramuscular injection into rats (6.25 mg./Kg.).

| Time, in hours after injection Antibiotics | 2 | 4 | 8 | 12 | 24 |
|---|---|---|---|---|---|
| Enduracidin | 7.0.5 | | 5.6 | | 6.5 |
| Enduracidin reduction product | 8.5 6.3 | | 8.6 | | 5.5 |

Concentrations of antibiotics (γ/ml. in plasma) in blood on intramuscular injection into rabbits (8 mg./Kg.)

| Hours after injection Antibiotics | 1 | 3 | 6 | 24 |
|---|---|---|---|---|
| Enduracidin | 2.75 | 3.20 | 4.30 | 2.45 |
| Enduracidin reduction product | 6.27 | 7.51 | 6.81 | 5.38 |

What is claimed is:

1. Reduction product of Enduracidin or its acid salt wherein the properties of the hydrochloride is as follows:

1. its decomposition point is 234–240° C,
2. its specific rotation is $[\alpha]_D^{26}$ + 82.8° (C=1.0, 70 percent methanol),
3. Rf values obtained in paper partition chromatography are as follows:

| Solvents | Rf value |
|---|---|
| Acetic acid: n-Butanol: Water (1:4:5) | 0.45 ± 0.1 |
| n-Butanol saturated with water | 0.0 |
| Pyridine: n-Butanol: Water (3:4:7) | 0.80 ± 0.1 |

4. its significant maximum-absorptions in ultraviolet spectrum are as follows:

$\lambda_{max}^{N/10}$ HCl= 230 mμ ($\epsilon_{1cm}^{1\%}$ = 201)
276 mμ ($\epsilon_{1cm}^{1\%}$ = 32.4)
282 mμ ($\epsilon_{1cm}^{1\%}$ = 30.9)
$\lambda_{max}^{N/10}$ NaOH= 250 mμ ($\epsilon_{1cm}^{1\%}$ = 289)
293 mμ ($\epsilon_{1cm}^{1\%}$ = 68)

5. its significant absorptions in Infrared spectrum (potassium bromide dish) are as follows:
3.02 (strong)
3.25 (shoulder)
3.38 (shoulder)
3.45 (strong)
5.75 (shoulder)
5.95 (shoulder)
6.09 (strong)
6.23 (shoulder)
6.47 (shoulder)
6.55 (shoulder)
6.61 (strong)
6.95 (shoulder)
7.25 (middle)
8.16 (broad, strong)
8.51 (middle)
9.89 (middle)
10.40 (weak)
11.93 (middle)
12.30 (weak)

6. its solubilities are as follows: Slightly soluble in water; soluble in aqueous methanol, aqueous acetone, aqueous acetic acid, dimethylformamide, pyridine and dioxane; insoluble in acetone, ethyl acetate, ether, chloroform.

7. its color reactions are as follows:

| Reagent | Result |

| | |
|---|---|
| Ninhydrin reagent | positive (pale-brownish violet) |
| Barton's reagent (a mixture of equal volume of 1% aqueous ferric chloride and 1% aqueous potassium ferricyanate) | positive (pale-blue) |
| Dragenorff reagent | positive (orangish-yellow) |
| Alkaline potassium permanganate | discoloration occurs (reduction) |

8. its elementary analysis is $C = 52.5 \pm 0.5$, $H = 6.22 \pm 0.3$, $N = 14.21 \pm 0.3$ and $Cl = 4.51 \pm 0.3$.

9. its $LD_{50}$ value in mice is 350 mg/Kg. (intravenous injection) and 1 g/Kg. (intraperitoneal injection).

10. it shows antimicrobial activity against gram-positive bacteria and phytopathogenic bacteria and no cross-resistance with tetracycline, chloramphenicol, erythromycin, cephaloridine, oleandmycin, kanamycin, streptomycin, penicillin-G, aminobenzyl-penicillin and neomycin.

2. The compound as claimed in claim 1, wherein the acid is selected from the group consisting of formic, acetic, propionic, aspartic, glutamic, hydrochloric and nitric acids.

3. The Enduracidin reduction product as claimed in claim 2, in the form of the hydrochloride.

4. The Enduracidin reduction product as claimed in claim 2, in the form of the acetate.

* * * * *